(12) United States Patent
Michalowski et al.

(10) Patent No.: US 10,573,191 B2
(45) Date of Patent: Feb. 25, 2020

(54) INTERACTIVE EDUCATIONAL TOOL

(71) Applicant: Adventium Enterprises, LLC, Minneapolis, MN (US)

(72) Inventors: Martin Michalowski, Minneapolis, MN (US); Todd P. Carpenter, St. Paul, MN (US); Kyle S. Nelson, Minneapolis, MN (US)

(73) Assignee: Andamio Games LLC, Minneapolis, MN (US)

( * ) Notice: Subject to any disclaimer, the term of this patent is extended or adjusted under 35 U.S.C. 154(b) by 127 days.

(21) Appl. No.: 16/011,575

(22) Filed: Jun. 18, 2018

(65) Prior Publication Data
US 2018/0301052 A1 Oct. 18, 2018

Related U.S. Application Data

(63) Continuation of application No. 14/731,872, filed on Jun. 5, 2015, now Pat. No. 10,002,540, which is a continuation of application No. 13/336,822, filed on Dec. 23, 2011, now Pat. No. 9,111,458.

(51) Int. Cl.
*G09B 7/02* (2006.01)
*G09B 5/12* (2006.01)

(52) U.S. Cl.
CPC ............... *G09B 7/02* (2013.01); *G09B 5/125* (2013.01)

(58) Field of Classification Search
CPC .................................. G09B 7/02; G09B 5/125
USPC ........................................................ 434/362
See application file for complete search history.

(56) References Cited

PUBLICATIONS

Danesh et al, Geney: Designing a collaborative activity for the Palm handheld computer. CHILetters: Human Factors in Computing Systems, CHI 2001,2001.3(1) (Year: 2001).*
Cabrera et al, Mystery in the museum: collaborative learning activities using handheld devices, Proceeding MobileHCI '05 Proceedings of the 7th international conference on Human computer interaction with mobile devices & services (pp. 315-318) (Year: 2005).*
"Quality Function Development," Accessed: Mar. 26, 2012, (2 pages), Retrieved from: http://www.qfdi.org/.
"AAAS (1993) Project 2061 Benchmarks," Accessed: Mar. 26, 2012, http://www.project2061.org/publications/bsl/online/bolintro.htm.
"ACT (2007) National Curriculum Survey 2005-2006," Accessed: Mar. 26, 2012, (100 pages), Retrieved from: http://www.act.org/research/curricsurvey.html.
Anderson, "Cognitive Styles and Multicultural Populations," Journal of Teacher Education, Jan. 1988, (9 pages), vol. 39, No. 1.

(Continued)

*Primary Examiner* — Thomas J Hong
(74) *Attorney, Agent, or Firm* — Brooks, Cameron & Huebsch, PLLC

(57) ABSTRACT

Systems, devices, and methods associated with interactive educational tools are described herein. One device includes instructions executable by a processor to cause a plurality of mobile devices to each represent a respective subsystem associated with an objective, cause an interaction between at least two of the plurality of mobile devices to represent a relationship between the respective subsystems represented by the at least two mobile devices, and aggregate a number of interactions between the at least two of the plurality of mobile devices to form a coordinated response associated with achieving a particular objective.

20 Claims, 3 Drawing Sheets

(56) References Cited

PUBLICATIONS

Beuscart, et al., "Business Models of the Web 2.0: Advertising or the Tale of Two Stories," Nov. 2008, (17 pages), Communications & Strategies Special Issue: Available at SSRN: http://papers.ssrn.com/abstract=1374448.

Blackwell, et al., "Implicit Theories of Intelligence Predict Achievement Across an Adolescent Transition: A Longitudinal Study and an Intervention," Child Development, Feb. 2007, 17 pages, vol. 78, No. 1.

Bybee, et al., "The BSCS 5E Instructional Model: Origins and Effectiveness," NIH Office of Science Education, Jun. 12, 2006, (80 pages), Retrieved from: http://science.education.nih.gov/.

Bybee, et al., "A Decade of Action: Sustaining Global Competitiveness," Accessed: Mar. 27, 2012 (3 pages).

"Science Content Standards for California Public Schools: Kindergarten through Grade Twelve," California State Board of Education. Oct. 1998, (61 pages), Retrieved from: http://www.cde.ca.gov/BE/ST/SS/documents/sciencestnd.pdf.

"National Science Education Standards," National Academy of Science, Accessed: May 10, 2013, (261 pages), Washington, DC, Retrieved from: http://www.nap.edu/catalog/4962.html.

Chen, "How to Create a Profitable Freemium Startup," Accessed: May 26, 2010, (24 pages), Retrieved from: http://andrewchenblog.com/2009/01/19/how-to-create-a-profitable-freemium-startup-spreadsheet-model-included/, (6 pages).

Donovan, et al., "How Students Learn: Science in the Classroom," National Academies Press, Accessed: Mar. 26, 2012, (264 pages), Washington, DC.

Pearson, et al., "Technically Speaking: Why all Americans need to Know More About Technology," National Academy of Engineering, Accessed: Mar. 26, 2012, (170 pages), Retrieved from: http://www.nap.edu/catalog/10250.html.

Conley, "Towrd a More Comprehensive Conception of College Readiness," Mar. 2007, (36 pages), Retrieved from: http://www.collegiatedirections.org/2007_Gates_CollegeReadinessPaper.pdf.

Hung, et al., "Virtual Neurons," Accessed: Mar. 26, 2009, (1 page), Retrieved from: http://brainu.org/virtual-neurons.

"iste.nets, The standards for learning, leading, and teaching in the digital age," International Society for Technology in Education, Accessed: Mar. 26, 2012, (1 page.), Retrieved from: http://www.iste.org/standards.aspx.

"Standard for Technological Literacy: Content for the Study of Technology," International Technology Education Association, Accessed: Mar. 26, 2012, (10 pages), Retrieved from: http://www.iteaconnect.org/TAA/PDFs/Execsum.pdf.

Kenderov, "Competitions and Mathematics Education," Proceedings of the International Congress of Mathematics European Mathematical Society, Madrid, Spain, 2006, Accessed: Mar. 26, 2012, (16 pages), Retrieved from: http://www.icm2006.org/proceedings/Vol_III/contents/ICM_Vol_3_76.pdf.

Kimele, "Using the Design for Six Sigma (DFSS) Approach to Design, Test, and Evaluate to Reduce Program Risk," Feb. 24-27, 2003, (39 pages), Retrieved from: http://www.dtic.mil/ndia/2003test/kiemele.pdf.

Ledesma, et al., "Adding a Touch of Technology," Teacher Magazine, Jun. 24, 2009, (11 pages), Retrieved from: http://www.edweek.org/tm/articles/2009/06/24/062409tln_ledesmajarosz.h21.html.

Lehtinen, "Computer Supported Collaborative Learning: An Approach to Powerful Learning Environments," Centre for Learning Research and Department of Teacher Training, Accessed: Mar. 26, 2012, (33 pages), Retrieved from: http://www.tml.tkk.fi/Opinnot/T-110.556/2004/Materiaali/EditedLehtinenCSCL1.pdf.

MacNabb, et al., "Neuroscience in Middle Schools: A Professional Development and Resource Program that Models Inquiry-based Strategies and Engages Teachers in Classroom Implementation," CBE—Life Sciences Education, Feb. 26, 2006, (19 pgs.), Retrieved from: http://www.ncbi.nlm.nih.gov/pmc/articles/PMC1618517/?tool=pubmed.

Mangels, et al., "Why do Beliefs about Intelligence Influence Learning Success? A Social Cognitive Neuroscience Model," Social Cognitive and Affective Neuroscience, vol. 1, Issue 2, Sep. 12, 2006, (17 pgs.), Retrieved from: http://www.ncbi.nlm.nih.gov/pmc/articles/PMC1838571/?tool=pubmed.

Iglesia, et al. "Doing Business by Selling Free Services." Accessed: Feb. 22, 2012, pp. 1-14, Web 2.0 The Business Model.

Massachusetts Department of Education, "Massachusetts Science and Technology/Engineering Curriculum Framework," Oct. 2006, 164 pages, Retrieved from: http://www.doe.mass.edu/frameworks/scitech/1006.pdf.

Mazur, "A Shortcut Through the Maze of Matrices," QFD for Small Businesses, Jun. 1994, (14 pgs.).

"Principles and Standards for School Mathematics," Accessed: Feb. 22, 2012, Retrieved from: http://www.nctm.org/ /standards/content.aspx?id=16909.

"Learning Standards for Mathematics, Science, and Technology", The University of the State of New York, Revised Edition Mar. 1996, (19 pages).

Pintrich, "The Role of Metacognitive Knowledge in Learning, Teaching, and Assessing," Accessed: Mar. 26, 2012, vol. 41, No. 4, Theory Into Practice, (5 pages).

Sanchez, "Motivating and Maximizing Learning in Minority Classrooms," Dec. 19, 2002, pp. 35-44, New Directions for Community Colleges (10 pages).

Schwartz, et al., "Depth Versus Breadth: How Content Coverage in High School Science courses Relates to Later Success in College Science Coursework," Science Education, Oct. 17, 2008, (29 pgs.).

"The Essential Principles of Neuroscience," Neuroscience Core Concepts, Accessed: Mar. 26, 2012, Retrieved from: http://www.sfn.org/index.aspx?pagename=core_concepts, (2 pgs.).

"What Work Requires of Schools: A SCANS Report for America 2000," US Department of Labor, Jun. 1991, 2 pages, Retrieved from: http://www.gsn.org/web/_shared/SCANS2000.pdf.

Verner, et al., "Robot Projects and Competitions as Education Design Experiments," Intelligent Automation and Soft Computing, Accessed: Feb. 23, 2012, pp. 57-68, vol. 13, No. 1, (12 pages).

Zurita, "Computer Supported Collaborative Learning Using Interconnected Handheld Computers," Computers and Education, Apr. 12, 2003, (26 pages).

* cited by examiner

INTERACTIVE EDUCATIONAL TOOL

This invention was made with government support under Grant Number 1R43MH096674-01 awarded by the National Institute of Health. The United States government may own certain rights in the invention.

BACKGROUND

Computing devices including mobile devices such as smartphones and personal digital assistants (PDAs) are often present in educational settings (e.g., classrooms). Educators may use students' familiarity with these devices to implement various curricula and/or lesson plans in a technology-driven manner.

Previous approaches to using such technology in educational settings may use smartphones as voting and/or answering devices (e.g., a student can send one or more answers to their teacher via a text message). Other approaches may allow students to record images and/or videos in various situations, such as videotaping laboratory experiments, for example. While these approaches may increase student interest and/or participation, they may not fully exploit the various functionalities available to these devices.

DETAILED DESCRIPTION

Figure 1:
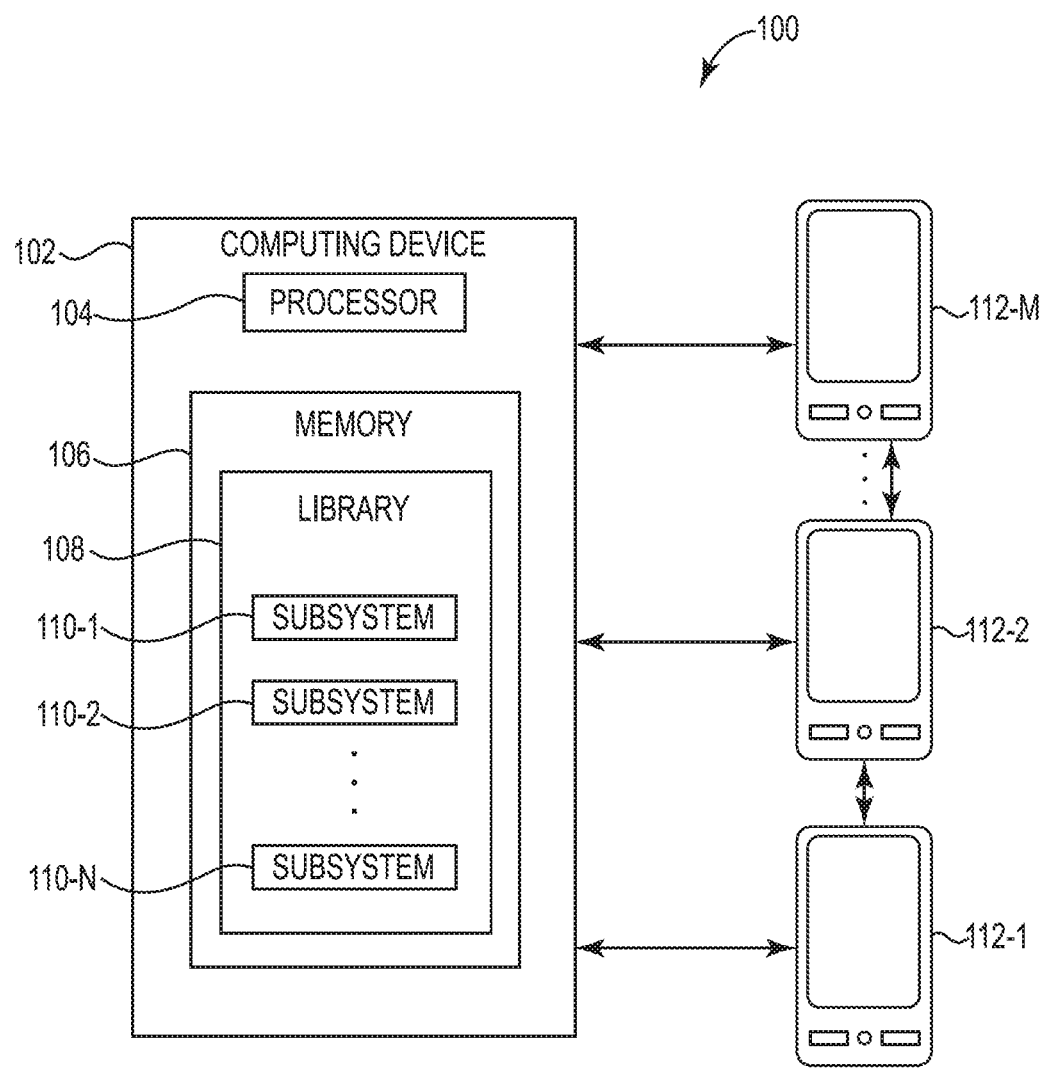
FIG. 1 illustrates a system associated with providing an interactive educational tool in accordance with one or more embodiments of the present disclosure.

Systems, devices, and methods associated with interactive educational tools are described herein. A number of embodiments include instructions executable to cause a plurality of mobile devices to each represent a respective subsystem associated with an objective, cause an interaction between at least two of the plurality of mobile devices to represent a relationship between the respective subsystems represented by the at least two mobile devices, and aggregate a number of interactions between the at least two of the plurality of mobile devices to form a coordinated response associated with achieving a particular objective.

Embodiments of the present disclosure can allow a number of users (e.g., students, contestants, teams, etc.) to work together to achieve an objective (e.g., an educational goal). Accordingly, embodiments of the present disclosure can be used to educate students in a variety of subjects including, by way of example and not limitation, cell biology, neuroscience, chemistry, physics, electrical engineering, sociology (e.g., social networking phenomena), and defense (e.g., interactions between hostile agents, cells and/or networks, etc.)

As a result, educators can more easily teach various educational topics and/or subjects historically perceived to be difficult to understand and/or teach (e.g., neuroscience). By exploiting the various functionalities of mobile devices, educators can make difficult subjects understandable at various levels of education and/or engage students in interactive ways.

Interactive teaching tools in accordance with embodiments of the present disclosure can enable learning by creating an engaging, hands-on, problem-solving learning environment. For example, embodiments of the present disclosure can be used in an immersive story-based set of objectives (e.g., challenges) to teach concepts associated with a physical system by transforming a number of mobile devices (e.g., handheld electronic devices) into functionally connected subsystems (e.g., physical components) of the system. As an example, interactions between mobile devices representing particular subsystems can represent interactions between the respective subsystems. In a number of embodiments, the interactions between the subsystems can represent a coordinated response associated with achieving a particular educational objective. Such coordinated responses can be displayed, for example, on a display (e.g., graphical user interface) of one or more of the number of mobile devices and/or on a display of a coordinating agent, such as a computing device operated by an educator/teacher.

Collaboration (e.g., cooperation and/or teamwork) can be encouraged by requiring students (e.g., a team) to work together to achieve an objective (e.g., an assigned and/or selected goal associated with a particular lesson plan). The objective can be assigned and/or selected by a teacher, by the team itself, and/or by a set of instructions (e.g., an application associated with the educational tool), for instance. Such mutually beneficial interaction can improve relationships between students and teachers and can improve a student's willingness and/or ability to learn, among other benefits.

Additionally, by teaching students about the functions of topics such as the human body, embodiments of the present disclosure can deepen students' understanding of how their own brains control body and cognitive functions and change with learning. Accordingly, embodiments of the present disclosure can be used to motivate students to generally apply themselves to education.

Various embodiments of the present disclosure can be compared with, mapped to, and/or measured against one or more educational standards, such as state educational standards and/or national educational initiatives (e.g., initiatives promulgated by the Science, Technology, Engineering, and Mathematics (STEM) Education Coalition). For example, participation and/or success of students using one or more embodiments of the present disclosure can be measured based on such standards and/or initiatives. Additionally, embodiments of the present disclosure can allow tracking of students' progress in meeting various educational objectives (e.g., objectives determined by a teacher in association with a particular lesson plan). Such objectives can, for example, correlate with specific educational standards and/or may be unique to a particular teacher (e.g., designed by the teacher).

In the following detailed description, reference is made to the accompanying drawings that form a part hereof. The drawings show by way of illustration how one or more embodiments of the disclosure may be practiced. These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 108 may reference element "08" in FIG. 1, and a similar element may be referenced as 208 in FIG. 2A.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of devices" can refer to one or more devices.

FIG. 1 illustrates a system 100 associated with providing an interactive educational tool in accordance with one or more embodiments of the present disclosure. As shown in FIG. 1, system 100 can include a computing device 102 having a number of mobile devices 112-1, 112-2, . . . 112-M communicatively coupled thereto. As used herein, a communicative coupling can refer to various wired and/or wireless connections between devices such that data can be transferred in various directions between the devices. As used herein, mobile device can refer to a handheld device (e.g., iPad, iPod, iTouch, iPhone, Android tablet, Android phone, Win phone, Win Tablet and/or RIM phone), netbook, laptop and/or desktop computing device and/or networked display (e.g., Smart Board) among combinations of these devices and/or others. Embodiments of the present disclosure are not limited to a particular number of mobile devices.

Computing device 102 can represent one of a number of computing devices associated with providing an interactive educational tool as part of a system 100. In this example, computing device 102 includes processor resources (e.g., processor 104) and memory resources (e.g., memory 106). Although not shown in FIG. 1, the computing device 102 can include a display, among various other components.

Computing device 102 can be a computing device such as a server (e.g., an application server), a laptop or desktop computer, and/or a mobile computing device, among various other types of computing devices. Processor 104 can include a number of processors (e.g., multiple processors or coprocessors), for example, and can execute instructions associated with providing an interactive educational tool as described herein.

Memory 106 can include volatile and/or nonvolatile memory. Memory 106 can include removable (e.g., portable) memory, or non-removable (e.g., internal) memory. For example, memory 106 can be random access memory (RAM) (e.g., dynamic random access memory (DRAM), and/or phase change random access memory (PCRAM)), read-only memory (ROM) (e.g., electrically erasable programmable read-only memory (EEPROM), and/or compact-disk read-only memory (CD-ROM)), flash memory, a laser disk, a digital versatile disk (DVD), and/or other optical disk storage), and/or a magnetic medium such as magnetic cassettes, tapes, or disks, among other types of memory, such as punch card, paper tape and/or memory accessible via one or more networks (e.g., in a cloud computing environment).

Memory 106 can include computer-executable instructions stored thereon. Computer-executable instructions can include a number of sets of instructions (e.g., software applications and/or program modules). Representation of sets of instructions can include machine code, assembler, byte code, object code, compiled and/or interpreted instructions and/or other representations. Generally, software applications and/or program modules include routines, programs, objects, components, data structures, etc. that perform particular functions or implement particular abstract data types. Distributed computing environments and/or cloud computing environments may be used where tasks are performed by remote processing devices that are linked through a communications network or other data transmission medium. In a distributed computing environment, program modules and other data may be located in both local and remote computer storage media including memory storage devices.

Memory 106 stores instructions capable of being executed by processor 104 to carry out various functions as described below. For example, memory 106 can store instructions executable by processor 104 to transmit a number of software applications and/or program modules to a number of mobile devices (e.g., mobile devices 112-1, 112-2, . . . , 112-M).

For instance, computing device 102 can be configured to transmit a number of sets of executable instructions (e.g., in the form of software applications and/or program modules) to the number of mobile devices 112-1, 112-2, . . . , 112-M. The instructions, when executed by the number of mobile devices 112-1, 112-2, . . . , 112-M, can cause a first mobile device (e.g., mobile device 112-1) to represent a first subsystem of a physical system associated with an educational objective, a second mobile device (e.g., mobile device 112-2) to represent a second subsystem of the physical system associated with the educational objective, and an interaction between the first and second mobile devices 112-1 and 112-2, respectively, to represent an interaction between the first and second subsystems. In various embodiments, the interaction between the first and second subsystems represents at least a portion of a coordinated response associated with achieving the educational objective, which can correspond to a particular lesson plan, for instance.

A portion of a software application and/or program module configured to be transmitted to a number of mobile devices 112-1, 112-2, . . . , 112-M is illustrated in FIG. 1 as library 108 having a number of subsystems 110-1, 110-2 . . . 110-N stored therein. In various embodiments, library 108 can be analogous to an application database wherein one or more subsystems (e.g., subsystems 110-1, 110-2 . . . 110-N) can be accessed by, and/or transmitted to, the number of mobile devices 112-1, 112-2, . . . , 112-M. In accordance with one or more embodiments of the present disclosure, library 108 can be analogous to library 208, which is discussed below in connection with FIGS. 2A and/or 2B.

Subsystem (e.g., subsystems 110-1, 110-2 . . . 110-N), as used herein, can refer to a number of physical components (e.g., a neuron, a cell, a molecule, a resistor, a transistor, etc.), a number of functionalities associated with a number of physical components (e.g., a signal sent from an axon), a number of relationships between physical components (e.g., a covalent bond between two atoms), and/or combinations thereof. In various embodiments, subsystems 110-1, 110-2 . . . 110-N can be subsystems of a physical system (e.g., cells of a living body, electrical components of a circuit, atoms of a molecule, etc.). Embodiments of the present disclosure do not limit library 108 to a particular number and/or type of subsystems.

In a number of embodiments of the present disclosure, mobile devices 112-1, 112-2, . . . , 112-M can interact and/or exchange information, for example, in a manner analogous to the operation of a number of subsystems 110-1, 110-2 . . . 110-N. Various interactions and relationships between mobile devices are discussed in more detail below in connection with FIG. 3.

A user, via a mobile device (e.g., 112-1, 112-2, ..., 112-M), can access computing device 102 in order to download one or more portions of library 108 (e.g., one or more portions corresponding to a selected number of subsystems 110-1, 110-2 ... 110-N) to the mobile device 112-1, 112-2, ..., 112-M. In various embodiments, access to, and/or transmission of, library 108 can be limited by computing device 102, for example, and/or by a user (e.g., an educator via a mobile device 112-1). For example, a user associated with mobile device 112-1 may be granted access to a particular portions of library 108 (e.g., to particular subsystems 110-1, 110-2 ... 110-N. The accessibility to library 108 may be based on an age and/or education level of a particular user, for example (discussed further below in connection with FIGS. 2A and 2B). As an example, the particular portions of library 108 to which a user has access may be based on a particular lesson plan, for instance. That is, in a number of embodiments, access to particular subsystems 110-1 to 110-N associated with library 108 can depend on which of the subsystems 110-1 to 110-N correspond to a particular lesson plan, which may include one or more particular educational objectives.

In various embodiments, user(s) associated with mobile device(s) 112-1, 112-2, ..., 112-M can access and/or acquire (e.g., download) library 108 as a portion of an application and/or program module received (e.g., downloaded) by mobile devices 112-1, 112-2, ..., 112-M. In such embodiments, the user(s) can thereafter select a number of subsystems 110-1, 110-2 ... 110-N locally (e.g., from previously received library 108 associated with the previously received application and/or program module).

Additionally, mobile devices 112-1, 112-2, ..., 112-M and/or additional computing devices (e.g., computing device 342 discussed below in connection with FIG. 3) can create and/or modify portions (e.g., subsystems 110-1, 110-2 ... 110-N) of library 108. Created and/or modified portions of library 108 can be saved (e.g., uploaded) to library 108 locally (e.g., on a number of mobile devices 112-1, 112-2, ..., 112-M) and/or to memory 106 of computing device 102.

Figure 2A:
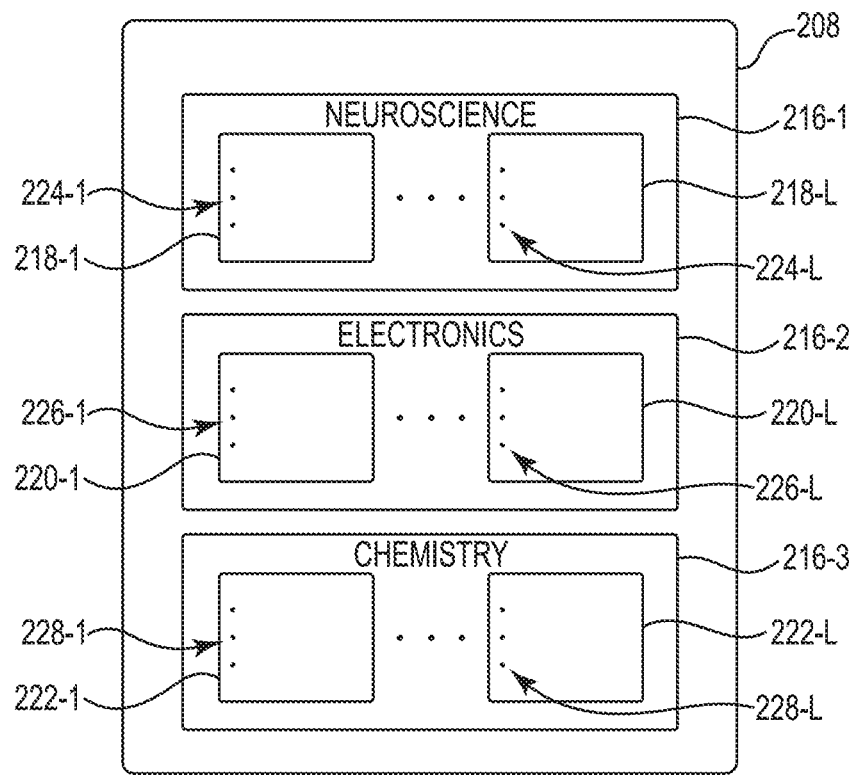
FIG. 2A illustrates an example of a library associated with an educational tool in accordance with one or more embodiments of the present disclosure.
Figure 2B:
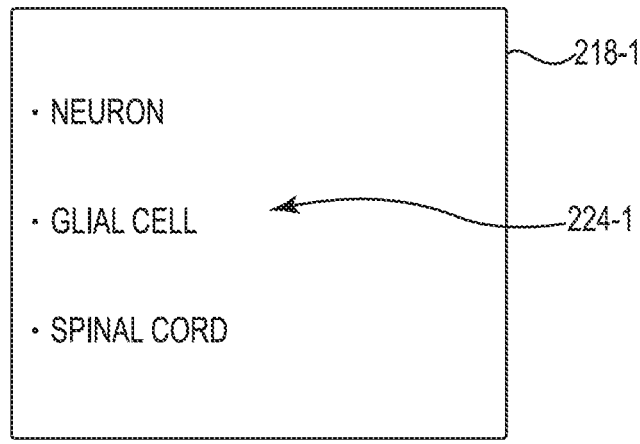
FIG. 2B illustrates an example of a complexity level associated with the library illustrated in FIG. 2A.

FIG. 2A illustrates an example of a library 208 associated with an educational tool in accordance with one or more embodiments of the present disclosure, and FIG. 2B illustrates an example of a complexity level 218-1 of the library 208 illustrated in FIG. 2A. Library 208 can be a library analogous to library 108, previously discussed in connection with FIG. 1, and can be accessed by, and/or transmitted to, a number of mobile devices, such as those previously described (e.g., mobile devices 112-1, 112-2, ..., 112-M).

Library 208 can include a number of subject matter categories (e.g., educational subjects) associated therewith. The subject matter categories can each include a number of subsystems corresponding thereto (e.g., subsystems 110-1, 110-2, ..., 110-N). In various embodiments, the subject matter categories can have a number of different complexity levels associated therewith.

In the example shown in FIG. 2A, library 208 includes three subject matter categories 216-1 (Neuroscience), 216-2 (Electronics), and 216-3 (Chemistry). Embodiments of the present disclosure are not limited to a particular number of subject matter categories and/or to the particular subject matter categories shown in FIGS. 2A and 2B.

Each of the subject matter categories 216-1, 216-2, and 216-3 include a number of complexity levels 218-1 ... 218-L, 220-1 ... 220-L, and 222-1 ... 222-L, respectively. The complexity levels 218-1 ... 218-L, 220-1 ... 220-L, and 222-1 ... 222-L can represent, for instance, different levels of detail corresponding to the subsystems associated with a particular subject matter category. For example, students in the fourth grade studying neuroscience can select and/or be assigned a complexity level (e.g., complexity level 218-1) corresponding to their educational level and students in high school can select and/or be assigned a more advanced complexity level (e.g., complexity level 218-L) corresponding to their more advanced educational level. Correspondence between complexity levels 218-1 ... 218-L, 220-1 ... 220-L, and 222-1 ... 222-L and educational levels can be determined based on pedagogical and/or educational standards, for instance.

As an example, a more advanced complexity level can indicate an increased amount of information and/or detail associated with subsystems corresponding to a particular subject matter category as compared to the amount of information and/or detail associated with related subsystems corresponding to the same particular subject matter at a less advanced complexity level. For example, the concept of a synapse can be taught to young students in relatively simple terms, such as a junction of an axon and a dendrite through which messages pass. The same concept can be taught to more advanced students with the inclusion of more complex topics such as neurotransmitters, receptors, voltage gated channels, etc. Various degrees of complexity (e.g., information and/or detail) can be provided by embodiments of the present disclosure. Display of such information is described further below in connection with FIG. 3.

Upon selection and/or assignment of a particular complexity level, users can select and/or be assigned a number of subsystems 224-1 ... 224-L, 226-1 ... 226-L, and 228-1 ... 228-L which can be represented by a number of mobile devices (e.g., mobile devices 112-1, 112-2, ..., 112-M, previously discussed in connection with FIG. 1). Subsystems 224-1 ... 224-L, 226-1 ... 226-L, and 228-1 ... 228-L can be analogous to subsystems 110-1, 110-2 ... 110-N, previously discussed in connection with FIG. 1, though embodiments of the present disclosure are not so limited.

Selecting and/or assigning a number of subsystems 224-1 ... 224-L, 226-1 ... 226-L, and 228-1 ... 228-L can cause a number of mobile devices to represent the number of subsystems 224-1 ... 224-L, 226-1 ... 226-L, and 228-1 ... 228-L as portions of a physical system, for instance. Referencing FIG. 2B, complexity level 218-1 includes a number of subsystems 224-1 (e.g., a list of subsystems 224-1 which can be associated with a number of educational objectives). The example subsystem list 224-1 includes neuron, glial cell, and spinal cord. A particular subsystem (e.g., a neuron) can be assigned to a mobile device (e.g., mobile device 112-1, previously described in connection with FIG. 1) such that interaction of the mobile device with additional mobile devices can represent interaction of the assigned subsystem with additional subsystems of a system (e.g., a neuron interacting with other components of a nervous system), for example. Interaction of mobile devices is discussed further below in connection with FIG. 3.

Subsystems within subject matter category 216-1 are not limited to those illustrated in subsystem list 224-1, nor are subsystems of the various embodiments limited to a particular subject matter category. Additional examples of subsystems include, for example, chemical groups, biological cells, circuit components (e.g., resistors), etc., as well as portions of these, such as molecules and/or cell structures, for example. Additionally, a subsystem can interact with another subsystem having a different complexity level and/ or level of abstraction (e.g., scope). For example, a mobile device can represent a single neuron cell and can interact with another mobile device representing a plurality of cells (e.g., a mass of muscle tissue).

Figure 3:
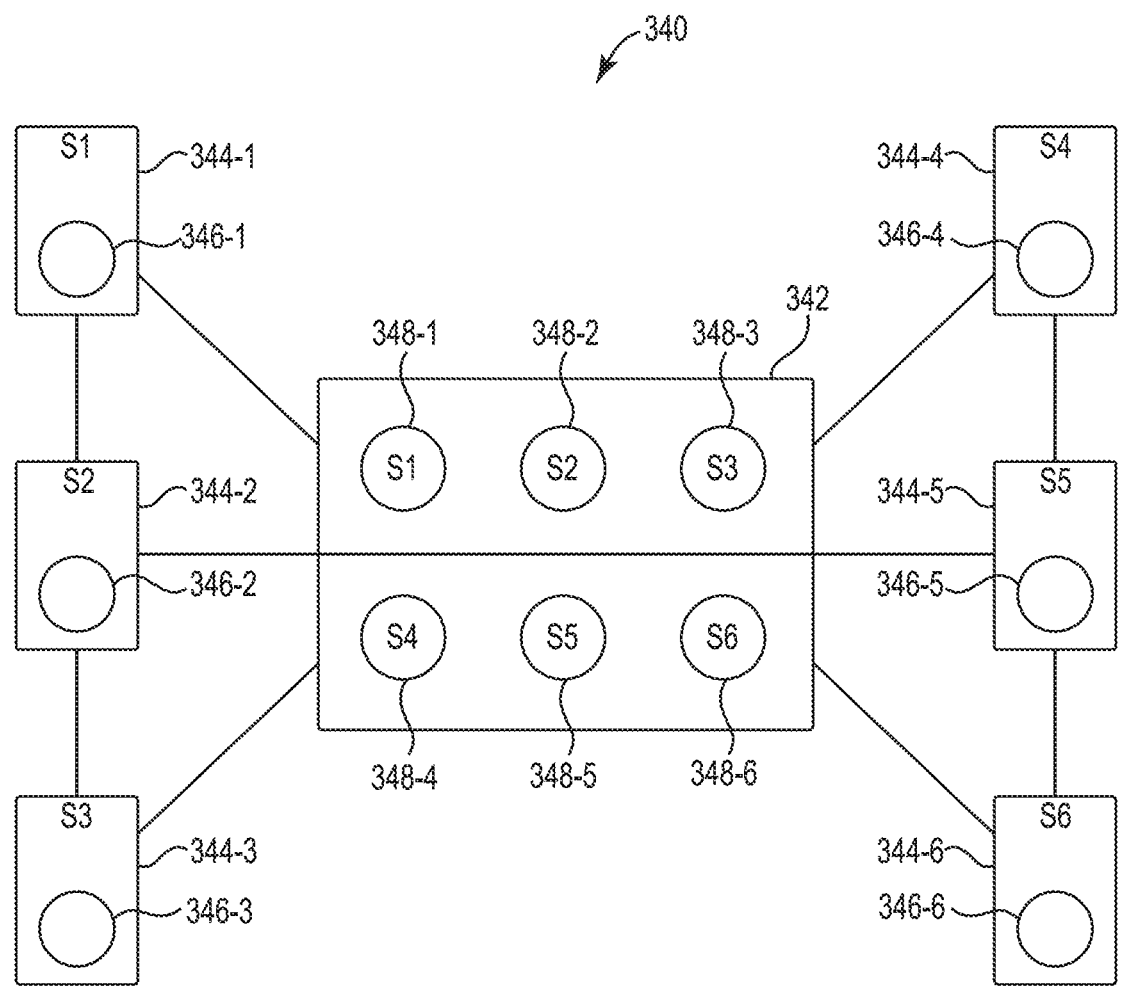
FIG. 3 illustrates an example of a system implementing an interactive educational tool in accordance with one or more embodiments of the present disclosure.

FIG. 3 illustrates an example of a system 340 implementing an interactive educational tool in accordance with one or more embodiments of the present disclosure. System 340 includes a computing device 342 (e.g., a coordinating computing device) and a number of mobile devices 344-1, 344-2, 344-3, 344-4, 344-5, and 344-6. Computing device 342 and/or mobile devices 344-1 to 344-6 can be computing devices functionally analogous to those previously discussed, for example (e.g., having memory and processor resources). In various embodiments, computing device 342 can be operated by an educator (e.g., teacher and/or instructor) and/or a disinterested user (e.g., judge and/or manager). It is to be appreciated that a coordinating computing device is not limited to computing device 342; rather, in various embodiments, a number of the mobile devices 344-1 to 344-6 can additionally or alternatively serve as a coordinating device. In various embodiments, mobile devices 344-1 to 344-6 can be operated by one or more users (e.g., students, team members and/or contestants) of an interactive educational tool as described herein. The devices of system 340 can be physically located in a same area (e.g., a classroom) and/or can be located remotely from each other.

In the example shown in FIG. 3, each mobile device 344-1 to 344-6 represents a particular subsystem (e.g., subsystem 224-1 . . . 224-L, 226-1 . . . 226-L, and 228-1 . . . 228-L described in FIG. 2A). For instance, device 344-1 represents a subsystem S1, device 344-2 represents a subsystem S2, device 344-3 represents a subsystem S3, device 344-4 represents a subsystem S4, device 344-5 represents a subsystem S5, and device 344-6 represents a subsystem S6. Embodiments of the present disclosure do not limit subsystems S1 to S6 to a particular type of subsystem. For example, each of subsystems S1 to S6 can be the same subsystem (e.g., a neuron) or various numbers of subsystems S1 to S6 can be different (e.g., S1 can be a neuron and S2 can be a muscle group). The mobile devices 344-1 to 344-6 each include a display to which a respective icon 346-1 to 346-6 can be displayed. The icons 346-1 to 346-6 can correspond to the particular subsystem S1 to S6 represented by the respective mobile devices 344-1 to 344-6.

As an example, users of mobile devices 344-1 to 344-6 can be organized as a number of teams. For instance, in this example, users associated with mobile devices 344-1, 344-2, and 344-3 are on a first team and users associated with mobile devices 344-4, 344-5, and 344-6 are on a second team.

As described further below, computing device 342 can display icons 348-1 to 348-6 corresponding to icons 346-1 to 346-6 of mobile devices 344-1 to 344-6 (e.g., in association with displaying a coordinated response received from a number of the mobile devices 344-1 to 344-6). The icons 348-1 to 348-6 can be displayed in various manners (e.g., in a split-screen view as illustrated in FIG. 3). Accordingly, computing device 342 can display the icons 348-1 to 348-6 in a manner corresponding to the division of the users into teams. For instance, icons 348-1 to 348-3 (e.g., those associated with the first team) are displayed on the top portion of the display of computing device 342, and icons 348-4 to 348-6 (e.g., those associated with the second team) are displayed on the bottom portion of the display of computing device 342). Embodiments of the present disclosure are not limited to a particular number of displays, icons, teams, and/or methods of displaying icons and/or indications of team divisions. As an example, computing device 342 can display icons 348-1 to 348-6 to a projection screen (e.g., smart board) allowing a number of users associated with mobile devices 344-1 to 344-6 to simultaneously view the display of computing device 342.

Upon assignment and/or selection of one or more of the number of subsystems (e.g., as previously discussed in connection with FIG. 1), mobile devices 344-1 to 344-6 can interact in various ways. Interaction between mobile devices 344-1 to 344-6 can include physical manipulation of one or more of mobile devices 344-1 to 344-6 (e.g., by one or more users), and/or a number of conditions not controlled and/or by managed by one or more users (e.g., conditions predefined upon selection and/or assignment of functionality to mobile devices 344-1 to 344-6), for instance. Interaction of mobile devices 344-1 to 344-6 is not limited to physical interaction. For example, a number of mobile devices 344-1 to 344-6 can act as a representation and/or simulacra (e.g., avatar) capable of interacting in a virtual environment (e.g., artificial reality). In various embodiments, a network of representations and/or simulacra (e.g., a network analogous to system 340) can be created on one of mobile devices 344-1 to 344-6 and/or on computing device 342.

In various embodiments, an objective (e.g., challenge, assignment, storyline, simulation, lesson plan, etc.) can be selected and/or assigned associated with a number of subject matter categories such as those previously discussed, for instance. Achieving the objective can include forming a coordinated response involving a number of interactions between at least two of the mobile devices 344-1 to 344-6. For example, achieving an objective associated with the creation of an electronic circuit can include a number of the mobile devices 344-1 to 344-6, representing a number of subsystems (e.g., resistors), interacting with each other.

Interaction can include physical interaction (e.g., manipulation of one or more of the mobile devices 344-1 to 344-6). Physical interaction can include the use of a contact-sensitive portion of a number of the devices 344-1 to 344-6 (e.g., a touch screen on one or more displays 346-1 to 346-6). In an example, an objective can be associated with a subject such as neuronal transmission, for instance. Achieving the objective can include releasing a number of neurotransmitters. In such an example, a user of mobile device 344-1 can touch display 346-1 of mobile device 344-1 to represent the release of a number of neurotransmitters, for instance. Such a release can be displayed on a number of the mobile device displays 346-1 to 346-6 and/or computing device 342 via icons 348-1 to 348-6.

Physical interaction of a number of the mobile devices 344-1 to 344-6 can include positioning a number of the mobile devices 344-1 to 344-6 with respect to a number of the other mobile devices 344-1 to 344-6, for example. An objective can be associated with cell signaling, in an example. Mobile devices 344-1 and 344-2 can represent biological cells, and an objective (e.g., illustrating paracrine signaling, a form of cell signaling in which the target cell is near the signal-releasing cell) can be achieved by positioning mobile devices 344-1 and 344-2 in proximity with each other. Such signaling can be displayed on a number of the mobile devices 344-1 to 344-6 and/or on computing device 342 (e.g., via icons 346-1 to 346-6 and/or via icons 348-1 to 348-6).

Physical interaction between a number of the mobile devices 344-1 to 344-6 can include physically contacting two or more of the mobile devices 344-1 to 344-6, for example. In the example regarding cell signaling, mobile devices 344-1 and 344-2 can achieve an objective associated with a particular type of cell signaling requiring cells to be in contact with each other (e.g., juxtracrine cell signaling) by being positioned in contact with each other. Contact can include contact with outer surfaces of mobile devices 344-1 and 344-2 and/or can include contact through a medium (e.g., a bidirectional cable linking mobile devices 344-1 and 344-2), for instance. Such a signaling can be displayed as icons 346-1 to 346-6 on displays of one or more of the mobile devices 344-1 to 344-6 and/or on a display of computing device 342 via icons 348-1 to 348-6.

Embodiments of the present disclosure associated with cell signaling are not limited to the types of signaling previously disclosed. Rather, various signaling types and/or methods can be a portion of an educational lesson. For example, endocrine signals in a body may target relatively distant cells. An objective associated with endocrine signaling can include a number of mobile devices 344-1 to 344-6 communicating over a particular distance (e.g., via a wireless network), for instance.

Physical interaction of a number of the mobile devices 344-1 to 344-6 can include, for example, a particular physical orientation of a number of the mobile devices 344-1 to 344-6. For example, mobile devices 344-1 and 344-2 can represent normally operating neurons conducting impulses through a synapse therebetween. A user of mobile device 344-2 can rotate mobile device 344-1 90 degrees, for example, to achieve an objective associated with the effects of an anesthetic on the neuron(s). In this example, a rotation of one or more of the mobile devices 344-1 to 344-6 can represent a prevention of impulse transmission through the synapse between the neurons represented by two or more of the mobile devices 344-1 to 344-6. A prevented impulse can be displayed on a number of the mobile devices 344-1 to 344-6 via icons 346-1 to 346-6 and/or computing device 342 via icons 348-1 to 348-6.

Physical interaction of a number of the mobile devices 344-1 to 344-6 can include, for example, movement of a number of the mobile devices 344-1 to 344-6. In an example, an objective can be associated with an illustration of Faraday's law. To achieve such an objective, mobile device 344-1 can represent a device (e.g., a magnet) generating a surrounding magnetic field, and mobile device 344-2 can represent a conductor (e.g., a coiled wire), for example. According to Faraday's law, movement of the conductor (e.g., mobile device 344-2) through the magnetic field (e.g., movement of device 344-2 with respect to mobile device 344-1) can induce a voltage in the conductor (e.g., a representation of an induced voltage displayed on mobile device 344-2). The achievement of the objective (e.g., the induced voltage) can be displayed on a number of the mobile devices via icons 346-1 to 346-6 and/or computing device 342 via icons 348-1 to 348-6.

Additionally, physical interaction of a number of the mobile devices 344-1 to 344-6 can include combinations of various physical manipulations of a number of the mobile devices 344-1 to 344-6 (e.g., coordinated gestures). In an example, mobile devices 344-1 and 344-2 can be representations of neurons. To achieve an objective associated with inducing a synapse between the neurons associated with mobile devices 344-1 and 344-2, users of these devices can move the devices toward each other and ultimately contact them (e.g., "bump" the devices together). A simulated synapse can be displayed on a number of the mobile devices 344-1 to 344-6 and/or computing device 342.

Combinations of physical manipulations can also include a simulation of a "toss and catch" between two or more of the mobile devices 344-1 to 344-6, for example. A simulated "toss and catch" can be similar to "bumping" devices, but may not, for instance, include physically contacting the devices. For example, a user of mobile device 344-1 can move mobile device 344-1 in a throwing gesture, while a user of mobile device 344-2 can move mobile device 344-2 in a catching gesture.

Condition(s) not controlled and/or managed by one or more users of mobile devices 344-1 to 344-6 can include a number of preprogrammed functionalities selected by and/or assigned to mobile devices 344-1 to 344-6. For example, if mobile devices 344-4 to 344-6 represent working neurons in a human brain (e.g., represented by various interactions between the devices, such as those previously discussed), one or more of the mobile devices 344-1 to 344-6 can be configured to become inert and/or inactive upon the passage of a particular period of time and/or number of interactions. Inactivity of one or more of the mobile devices can be used as a portion of an objective associated with understanding the degenerative effects of Alzheimer's disease, for example.

Additionally, interaction between mobile devices 344-1 to 344-6 can depend upon physical locations of a number of the mobile devices 344-1 to 344-6. For example, team 1 (e.g., mobile devices 344-1 to 344-3) and team 2 (e.g., mobile devices 344-4 to 344-5) can be separated by a particular geographic distance. In an example where team 1 and team 2 represent different portions of a human body, locations of team 1 and team 2 (e.g., determined by GPS technology) can be mapped on to a graphical representation of a body.

For example, team 1 and team 2 can be formed based on geographic location(s) of the teams. Mapping the teams to a graphical representation of a body can teach contextual information to users of the devices (e.g., students) by varying granularity of displayed information. For example, users can visualize a high-level view of a body and can zoom in on a number of particular locations where a number of interactions may take place. Such varying granularity can be used in a classroom environment (e.g., where teams are separated by classrooms in an educational environment) and/or outside the classroom environment. Formation of teams in accordance with embodiments of the present disclosure is not limited to formation based on geographic and/or relationships; various bases of team formation are anticipated.

Further, methods and/or manners of interaction between mobile devices 344-1 to 344-6 can be selected and/or assigned based on a number of objectives. For example, if mobile devices 344-1 to 344-6 are being used to achieve an objective associated with creating a set of interconnected neurons, one or more objectives can be achieved responsive to one or more of the mobile devices 344-1 to 344-6 being within a particular distance of the other(s) to interact. Such a distance can be selected to reinforce an educational lesson to users of mobile devices 344-1 to 344-6 regarding the close proximity of neurons required for an electrical synapse (e.g., as compared with a chemical synapse), for example. In various embodiments, such means for achieving objectives can be predefined upon selection and/or assignment of subsystem(s) and/or objective(s) to mobile devices 344-1 to 344-6. Additionally, such means for achieving objectives can be set, adjusted, and/or managed by a user (e.g., educator and/or manager) associated with coordinating computing device 342, for example, or by one or more user(s) of one or more of the mobile devices 344-1 to 344-6.

As previously discussed, a plurality of mobile devices (e.g., mobile devices 344-1 to 344-6) can be divided into a number of teams. And, as previously discussed, subsystems can be selected and/or assigned based on a number of objectives (e.g., educational objectives associated with a lesson plan). An example objective can include moving a representation of an arm. Achieving such an objective can include forming a correct configuration and/or coordinating a number of interactions between number of representational neurons (e.g., represented by mobile devices 344-1 to 344-3), for example. Further, achieving an objective can include a team of users working together in cooperation (e.g., in competition against another team). Achieving an objective can include an individual user (e.g., a user associated with mobile device 344-1) and/or a coordinated response from a team including a number of users (e.g., users associated with mobile devices 344-1 to 344-3).

Mobile devices 344-1 to 344-6 and/or computing device 342 can display one or more objectives and/or one or more ways to achieve the objective(s). In various embodiments, computing device 342 can be associated with a non-participant of an educational lesson (e.g., a judge) who can monitor (e.g., observe) interactions between mobile devices 344-1 to 344-6 and/or achievement of objectives assigned to mobile devices 344-1 to 344-6. Accordingly, computing device 342 can be used to monitor the progress, toward the solution, of users of the mobile devices 344-1 to 344-6. Additionally, educational development of students across a number of educational lessons having various objectives can be tracked (e.g., via computing device 342).

In various embodiments, a method (e.g., technique, tactic, and/or approach) to achieve an objective can be communicated to one or more of mobile devices 344-1 to 344-6. For example, users of one or more of mobile devices 344-1 to 344-6 may be experiencing difficulty achieving an objective. A method of achieving the objective (e.g., a hint) can be communicated to one or more of such users. Additionally, a method of achieving an objective can be communicated to one user (e.g., via mobile device 344-5) such that the user can coordinate (e.g., manage and/or dictate) various interactions between mobile devices 344-1 to 344-6 to achieve the objective.

An achieved objective, and/or interactions between mobile devices 344-1 to 344-6 used to achieve the objective, can be compared to and/or measured against a number of educational standards. Such standards can include, for example, community, school, state and/or federal education standards, among others. In this manner, students' progress (e.g., improvement) can be monitored and/or tracked across a number of objectives and/or lesson plans, for instance.

Further, an achieved objective and/or interactions between mobile devices 344-1 to 344-6 used to achieve the objective, can be compared to an educational model (e.g., a key and/or rubric) that can display a model solution and/or a best mode of achieving the objective. In various embodiments, such a model can be communicated to mobile devices 344-1 to 344-6 and/or to computing device 342 from library 108 and/or 208, previously discussed in connection with FIGS. 1, 2A and/or 2B, for example.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A non-transitory computer-readable medium having instructions associated with an interactive education tool stored thereon, the instructions executable by a processor to:
    provide a library of educational subjects, each having a number of simulated physical components corresponding thereto;
    allow a first user access to a particular portion of the library associated with an educational subject via a first mobile device, wherein the particular portion to which the first user is allowed access is determined based on an education level associated with the first user;
    allow a second user access to a particular portion of the library associated with the educational subject via a second mobile device, wherein the particular portion to which the second user is allowed access is determined based on an education level associated with the second user;
    cause the first mobile device to simulate a first physical component of the particular portion of the library associated with the educational subject;
    cause the second mobile device to simulate a second physical component of the particular portion of the library associated with the educational subject; and
    cause a collaborative interaction between the first mobile device and the second mobile device to simulate a relationship between the first physical component and the second physical component.

2. The system of claim 1, wherein a number of educational subjects of the library include a number of different complexity levels associated therewith.

3. The system of claim 2 wherein each of the number of different complexity levels includes a number of particular subsystems associated therewith.

4. The computer-readable medium of claim 1, wherein:
    the education level associated with the first user correlates to a first complexity level displayed by the first mobile device of the first simulated physical component and the simulated relationship; and
    the education level associated with the second user correlates to a second complexity level displayed by the second mobile device of the second simulated physical component and the simulated relationship.

5. The computer-readable medium of claim 1, wherein the first simulated physical component and the second simulated physical component are a same component.

6. The computer-readable medium of claim 1, wherein the first simulated physical component and the second simulated physical component are different components.

7. The computer-readable medium of claim 1, wherein the instructions include instructions to:
   allow the first user to modify a portion of the first simulated physical component; and
   allow the second user to modify a portion of the second simulated physical component.

8. The computer-readable medium of claim 7, wherein the instructions include instructions to save the modified first simulated physical component and the modified second simulated physical component to the library.

9. The computer-readable medium of claim 1, wherein the first simulated physical component is assigned to the first mobile device and wherein the second simulated physical component is assigned to the second mobile device.

10. The computer-readable medium of claim 1, wherein the first simulated physical component is selected by a first user via the first mobile device and wherein the second simulated physical component is selected by a second user via the second mobile device.

11. A non-transitory computer-readable medium having instructions associated with an interactive education tool stored thereon, the instructions executable by a processor to:
   provide a library of subject matters, each having a number of simulated physical components corresponding thereto;
   allow a first user access to a particular portion of the library associated with a subject matter via a first mobile device, wherein the particular portion to which the first user is allowed access is determined based on an age associated with the first user;
   allow a second user access to a particular portion of the library associated with the subject matter via a second mobile device, wherein the particular portion to which the second user is allowed access is determined based on an age associated with the second user;
   cause the first mobile device to simulate a first physical component of the particular portion of the library associated with the subject matter;
   cause the second mobile device to simulate a second physical component of the particular portion of the library associated with the subject matter; and
   cause a collaborative interaction between the first mobile device and the second mobile device to simulate a relationship between the first physical component and the second physical component.

12. The computer-readable medium of claim 11, including instructions to determine the particular portion of the library to which the first user is allowed access and the particular portion of the library to which the second user is allowed access based on a pedagogical standard.

13. The computer-readable medium of claim 11, including instructions to:
   provide the first mobile device a first amount of detail corresponding to the first physical component; and
   provide the second mobile device a second amount of detail corresponding to the second physical component.

14. The computer-readable medium of claim 11, including instructions to:
   cause the first mobile device to display a description of the simulated relationship via a first set of terms; and
   cause the second mobile device to display a description of the simulated relationship via a second set of terms.

15. A non-transitory computer-readable medium having instructions associated with an interactive education tool stored thereon, the instructions executable by a processor to:
   provide a library of educational subjects, each having a number of simulated physical components corresponding thereto, and each having a number of different complexity levels associated therewith;
   allow a first user to select a particular educational subject of the library and a first complexity level associated with the educational subject via a first mobile device;
   allow a second user to select the particular educational subject of the library and a second complexity level associated with the educational subject via a second mobile device;
   cause the first mobile device to simulate a first physical component of the educational subject;
   cause the second mobile device to simulate a second physical component of the educational subject; and
   cause a collaborative interaction between the first mobile device and the second mobile device to simulate a relationship between the first physical component and the second physical component.

16. The computer-readable medium of claim 15, wherein the first complexity level includes a first level of detail corresponding to the educational subject, and wherein the second complexity level includes a second level of detail corresponding to the educational subject.

17. The computer-readable medium of claim 16, wherein the first level of detail corresponds to a first educational grade level, and wherein the second level of detail corresponds to a second educational grade level.

18. The computer-readable medium of claim 15, wherein the first complexity level includes a first amount of information corresponding to the educational subject, and wherein the second complexity level includes a second amount of information corresponding to the educational subject.

19. The computer-readable medium of claim 15, including instructions to:
   cause the first mobile device to simulate the first physical component combined with a first plurality of physical components of the educational subject; and
   cause the collaborative interaction between the first mobile device and the second mobile device to simulate a relationship between the first physical component combined with the first plurality of physical components and the second physical component.

20. The computer-readable medium of claim 15, including instructions to:
   cause the first mobile device to simulate the first physical component combined with a first plurality of physical components of the educational subject;
   cause the second mobile device to simulate the second physical component combined with a second plurality of physical components of the educational subject; and
   cause the collaborative interaction between the first mobile device and the second mobile device to simulate a relationship between the first physical component combined with the first plurality of physical components and the second physical component combined with the second plurality of physical components.

* * * * *